(12) United States Patent
Saberan et al.

(10) Patent No.: US 6,508,512 B2
(45) Date of Patent: Jan. 21, 2003

(54) HINGED HEADREST FOR A VEHICLE SEAT

(75) Inventors: Mohammad Saberan, New Baltimore, MI (US); Brian Phillips, Almont, MI (US); David J. Thieda, Macomb, MI (US); Philip W. Leistra, III, Birmingham, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/935,029

(22) Filed: Aug. 22, 2001

(65) Prior Publication Data

US 2002/0079732 A1 Jun. 27, 2002

Related U.S. Application Data

(60) Provisional application No. 60/227,338, filed on Aug. 23, 2000.

(51) Int. Cl.[7] ................................................ A47C 7/36
(52) U.S. Cl. ...................... 297/408; 297/410; 297/391; 297/400
(58) Field of Search ............................... 297/410, 408, 297/391, 403, 400, 409

(56) References Cited

U.S. PATENT DOCUMENTS

| | | | |
|---|---|---|---|
| 2,828,810 A | * | 4/1958 | Barecki et al. ............. 297/408 |
| 4,322,111 A | * | 3/1982 | Barley et al. .............. 297/357 |
| 4,765,683 A | | 8/1988 | Hattori |
| 4,796,953 A | | 1/1989 | Pereira |
| 5,003,240 A | | 3/1991 | Ikeda |
| 5,011,225 A | | 4/1991 | Nemoto |
| 5,011,226 A | | 4/1991 | Ikeda et al. |
| 5,145,233 A | | 9/1992 | Nagashima |
| 5,177,823 A | * | 1/1993 | Riach ............................. 5/636 |
| 5,288,129 A | | 2/1994 | Nemoto |
| 5,590,933 A | | 1/1997 | Andersson |
| 5,669,668 A | | 9/1997 | Leuchtmann |
| 5,934,755 A | * | 8/1999 | Halamish ..................... 297/410 |
| 6,062,645 A | * | 5/2000 | Russell ........................ 297/410 |
| 6,074,010 A | | 6/2000 | Takeda |
| 6,368,261 B1 | * | 4/2002 | Doehler ...................... 482/142 |

* cited by examiner

Primary Examiner—Peter M. Cuomo
Assistant Examiner—Stephanie Harris
(74) Attorney, Agent, or Firm—MacMillan, Sobanski & Todd, LLC

(57) ABSTRACT

A headrest assembly (36) for a vehicle seat (10) and a method of installation. The headrest assembly (36) includes a support post (28) pivotally connected to an installation post (16) via an installation hinge (30). The installation post (16) is installed into a guide sleeve (14) of the seat back (12) such that the installation hinge (30) is still exposed, allowing the headrest body (34) to tip down and forward. The seat (10) is then installed into the vehicle body (50), after which, the headrest body (34) is tipped up and pushed down until a support post notch (38) engages with an installation catch (20) mounted on the guide sleeve (14). The headrest (36) will now remain in its use position with the hinge (30) contained within the guide sleeve (14).

12 Claims, 3 Drawing Sheets

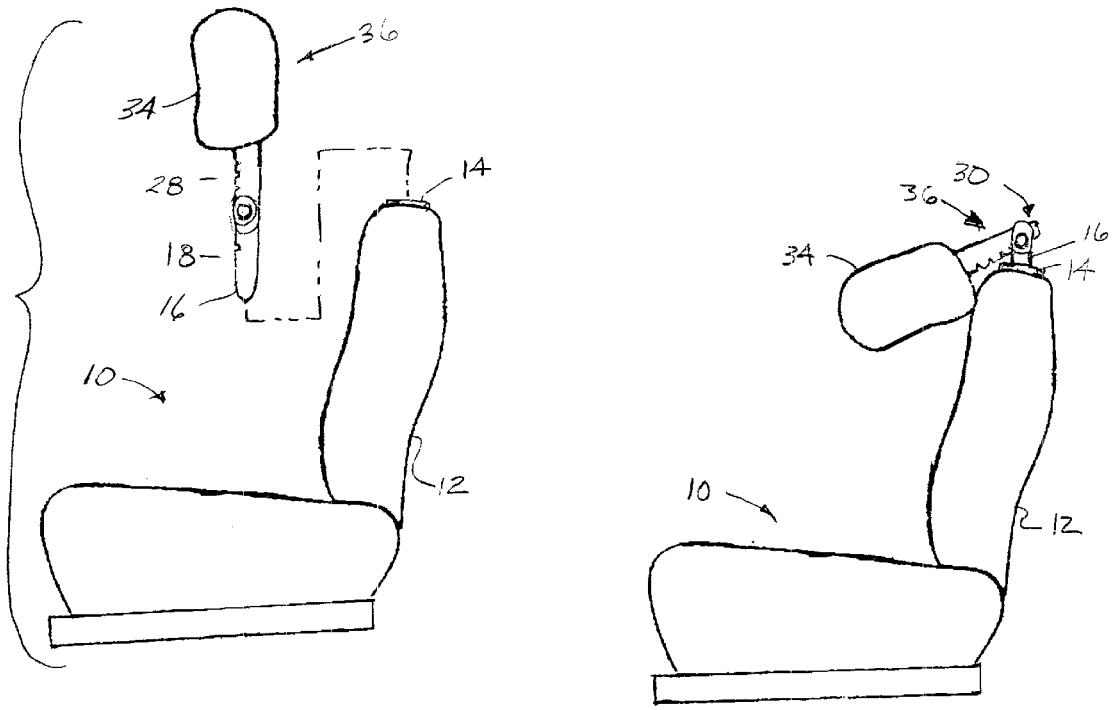
FIG. 3a
Fig. 3b
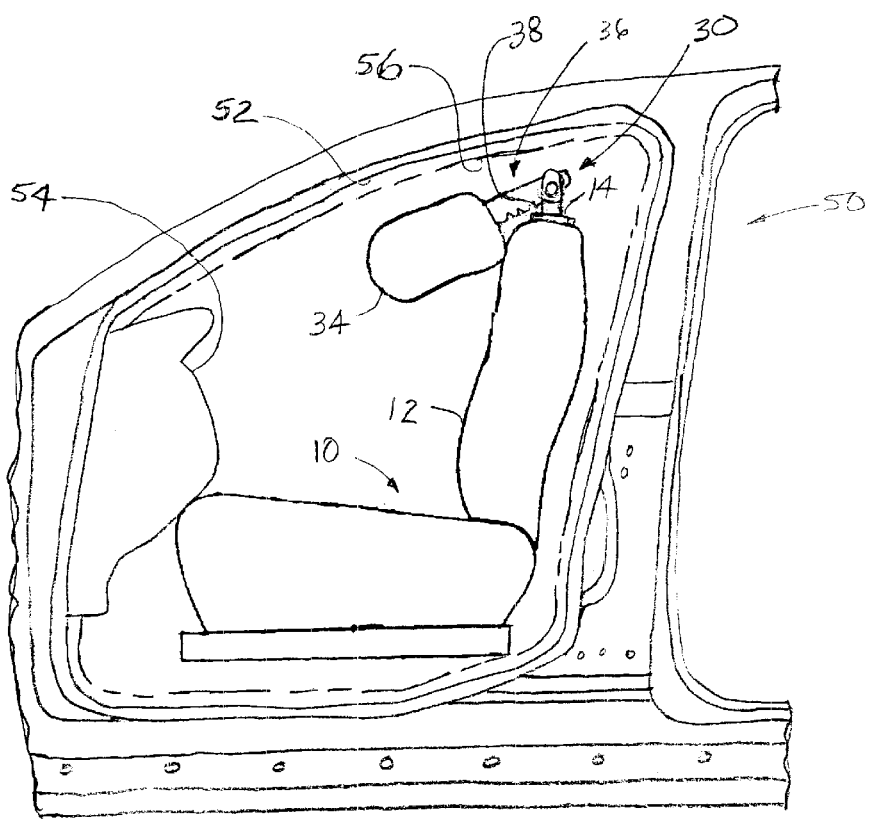
FIG. 3c

HINGED HEADREST FOR A VEHICLE SEAT

CROSS REFERENCE TO RELATED APPLICATION

This application claims the benefit of U.S. provisional patent application serial No. 60/227,338, filed Aug. 23, 2000.

TECHNICAL FIELD

The present invention relates to headrests used with vehicle seats and more particularly to headrests with installation hinges for use with vehicle seats.

BACKGROUND OF THE INVENTION

Conventionally, for vehicle seats with headrests, if the door opening is big enough, the seat is installed in the vehicle with the headrest attached. Since the seats are typically assembled in different locations than the plant for the vehicle assembly, this makes keeping track of the headrests and final seat assembly easier. Recently, however, seat and headrest combinations are being made taller to meet newer government head impact requirements, while at the same time the doors for some vehicles are being made smaller. Consequently, the vehicle door opening is smaller than the height of the seat with the headrest in its normal use position. In some vehicles, this can be overcome in the rear seats because, by coincidence, they have a system to flip the headrest forward and down to remove it from the driver's line of sight when driving while no one occupies the back seat. But such a system is not desirable in a front seat, nor is it cost effective in the back seat for many vehicles.

Thus, to overcome this problem, seat manufacturers are assembling and shipping the seats and headrests separately, with the installation of the headrests after the seats are installed in the vehicle. After installation, then, the assembly line worker at the vehicle plant inspects the headrest to assure proper installation.

While assembly of the headrest at the vehicle plant can be made to work, it is much more expedient to assemble, inspect and test the headrest at the time the seat is assembled. Assembling the headrests to the seats before shipping eliminates the need to track and match headrests to seats, it allows one to test the seat and headrest at once without bending over inside the vehicle. Further, some new headrests may include electronics, such as speakers or an antenna, and it is easier to make the electrical connection and test it at the time the seat is assembled rather than after the seat is installed in the vehicle.

Thus, it is desirable to have a headrest and vehicle seat that overcome the drawbacks of the conventional headrest and seat assemblies. In particular, it is desirable to have a simple, inexpensive and reliable headrest assembly that can be assembled to a vehicle seat and tilted down prior to installation, in order to ease the installation of the seat into the vehicle, and then allows the headrest to be tilted up and pushed into its use position so that the headrest assembly will not under normal use tilt all of the way down to its pre-installation position.

SUMMARY OF THE INVENTION

In its embodiments, the present invention contemplates a headrest for a vehicle seat having a seat back and a support receiver with a removal limiter. The headrest includes a main body adapted for receiving a head of a vehicle occupant, and an installation post having a first end adapted to be received within the support receiver, and a second end, disposed opposite to the first end, having a hinge receiving portion. The headrest also includes a support post having a first end securely connected to the main body, a second end, disposed opposite to the first end, having a hinge portion pivotally connected to the hinge receiving portion, and a first engagement device adapted to engage with the removal limiter when the hinge portion is received within the support receiver.

The present invention further contemplates a method for installing a seat and headrest into a vehicle, with the seat having a seat back portion that includes a support receiver and a removal limiter, and the headrest having a main body; an installation post having a first end received within the support receiver, and a second end, disposed opposite to the first end, having a hinge receiving portion; and a support post having a first end securely connected to the main body, a second end, disposed opposite to the first end, having a hinge portion pivotally connected to the hinge receiving portion, and a first engagement device engageable with the removal limiter when the hinge portion is received within the support receiver; the method comprising the steps of: hingedly connecting a headrest support post to a headrest installation post; installing the installation post partially within the support receiver of the seat back prior to installation of the seat into the vehicle; installing the seat into the vehicle; and after installation of the seat into the vehicle, manipulating the headrest to cause the support post to partially insert within the support receiver such that the removal limiter engages the first engagement device.

Accordingly, an object of the present invention is to provide a headrest for a vehicle seat that can be installed onto the seat prior to installation in the vehicle, even when the vehicle door opening is too small to accommodate the seat and headrest when the headrest is in its use position.

Another object of the present invention is to satisfy the above noted object of the invention with minimum impact on expense, complexity and weight of the vehicle.

An advantage of the present invention is that a headrest can be assembled to a vehicle seat and tilted down via an installation post and an installation hinge in order to ease the installation of the seat into the vehicle, and then allow the headrest to be tilted up and pushed into its use position so that the installation hinge is no longer operable.

Another advantage of the present invention is that a headrest can be installed on a seat at a seat assembly plant, and once the seat is installed in the vehicle, manipulated into its use position.

An additional advantage of the present invention is that the installation post and hinge can be of a lighter weight material than the support post since the installation post and hinge will not be subjected to occupant loads once fully installed in the seat after the seat is installed in the vehicle.

A further advantage of the present invention is that the conventional seat back and its guide sleeve do not need to change to accommodate the headrest assembly with the installation post and hinge since the catch on the guide sleeve can be the same.

BRIEF DESCRIPTION OF THE DRAWINGS

FIGS. 3a–3d are schematic representations illustrating the installation process in accordance with the present invention.

DETAILED DESCRIPTION OF THE PREFERRED EMBODIMENTS

Figure 2:
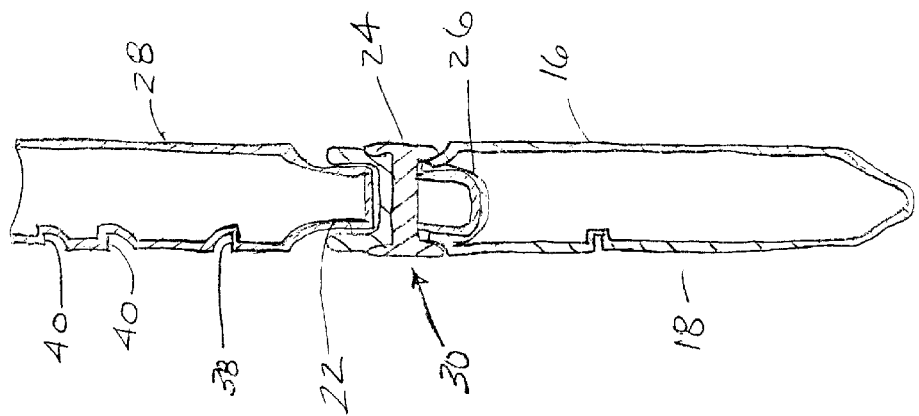
FIG. 2 is a side sectional view, on an enlarged scale, of a headrest support post and installation post accordance with the present invention.
Figure 1:
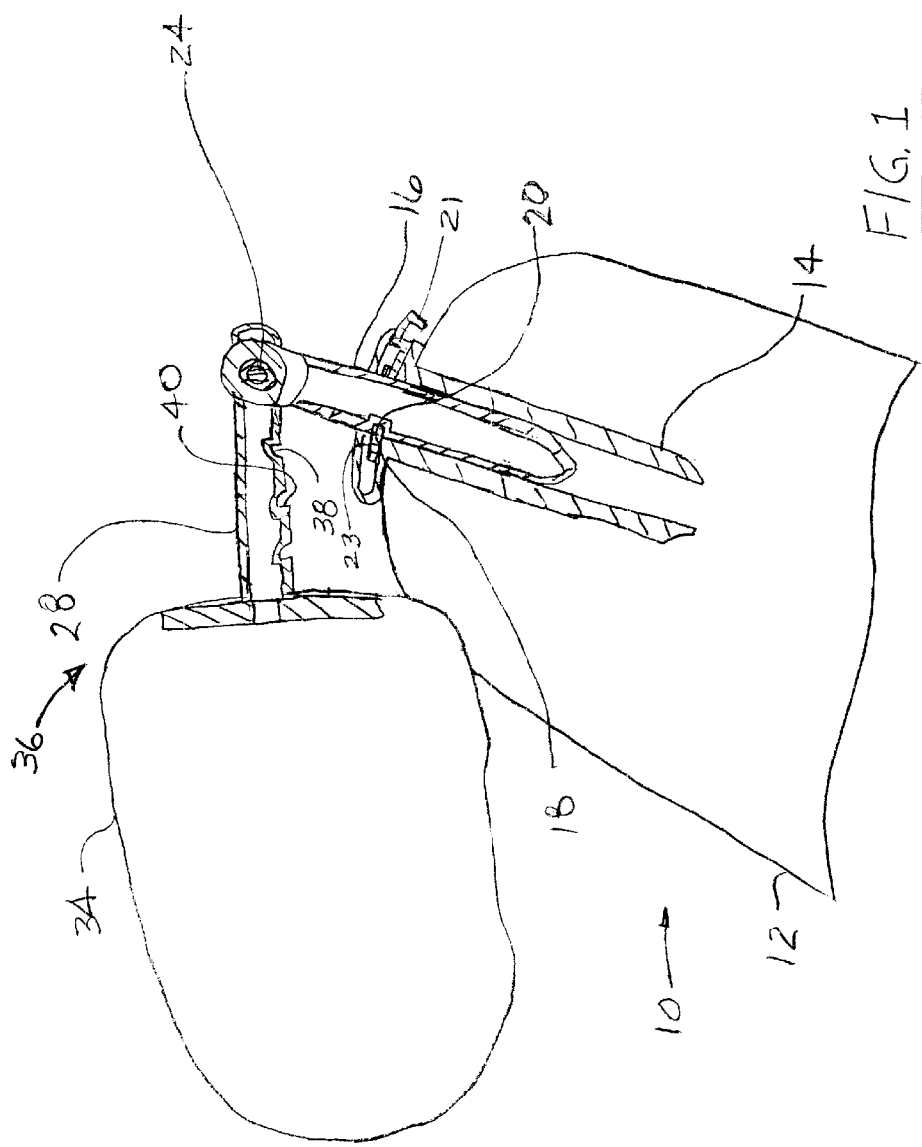
FIG. 1 is a schematic representation of a seat having a headrest in a pre-installation position.

FIGS. 1 and 2 show a vehicle seat 10 having a seat back 12, with a pair of headrest guide sleeves 14 mounted side-by-side therein, (only one shown for clarity). While this embodiment discloses a headrest with a pair of support posts, the invention is also applicable to headrests with different numbers of support posts. Telescopically inserted within each guide sleeve 14 is an installation post 16. Each installation post 16 includes an installation notch 18 that is shaped to engage with an installation catch 20 mounted to the respective guide sleeve 14. Each installation catch 20 includes a catch flange portion 23 and a catch release portion 21. The installation notch 18 is squared off so that once the respective catch flange 23 engages the notch 18, it cannot be disengaged without fully pressing in the catch release 21.

Each installation post 16 also includes a slotted opening 22 at its top end that receives a hinge screw 24 and a bottom end 26 of a respective support post 28. The top end 32 of each of the support posts 28 connects to and supports a main body 34 of the headrest assembly 36. The support posts each also include a support post installation notch 38 which is shaped to engage the catch flange 23 on the respective guide sleeve 14. The installation notch 18, support post notch 38 and installation catch 20 can include conventional locks, rods, and notches, which cooperate with conventional headrests and guide sleeves to retain the mounting posts within the guide sleeve.

For a particular vehicle seat and headrest assembly, it is preferred that only one of the support posts have the notches and only the corresponding guide sleeve have an installation catch, although both may have such a mechanism, if so desired. The example shown herein has a notch 38 that is squared off on the bottom, but rounded off on the top, thus allowing the headrest 36 to be easily pushed down into the seat, but only pulled up when the catch release 21 is pressed. Two other comfort adjustment notches 40 are shown, which are optional and operate in a conventional manner for adjusting the height of the headrest 34.

An installation hinge 30 is formed by the slotted opening 22, hinge screw 24 and bottom end 26 of the support post 28. This hinge 30 pivotally connects the headrest main body 34 to the seat back 12.

The installation post 16 can be made of a lightweight, low strength material, such as an inexpensive plastic, since only the support post 28 and main body 34 will function in the manner of a conventional headrest assembly for impact resistance. The support posts 28, then, will need to be made robust enough to meet governmental head impact requirements, as with conventional headrests. Typically, the support posts 28 will be made of metal or other high strength material.

Figure 3D:
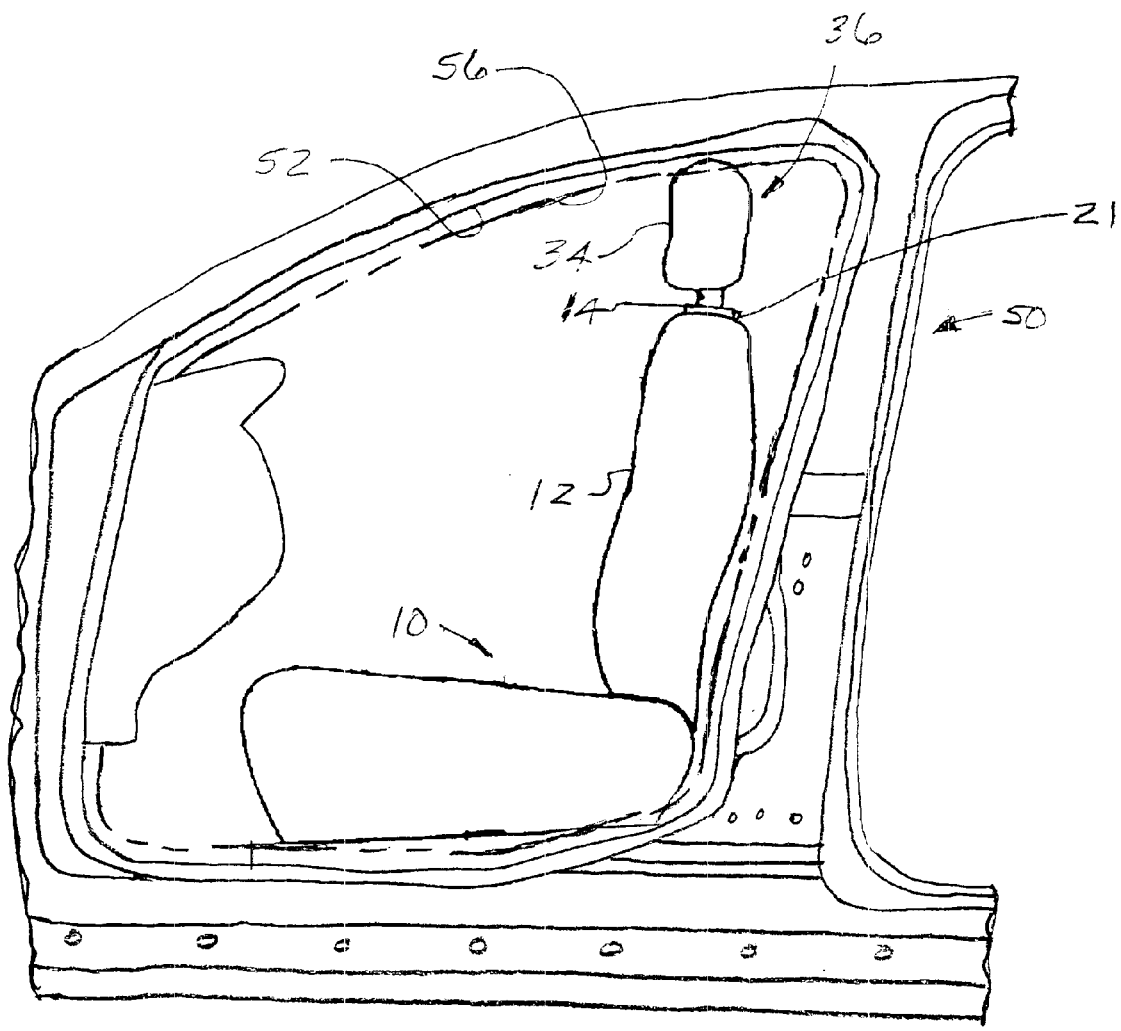

The assembly process will now be described with reference to FIGS. 3a–3d. FIG. 3a shows an assembled vehicle seat 10 and a separate assembled headrest assembly 36. Then, as shown in FIG. 3b, the installation post 16 is telescopically inserted into the guide sleeve 14 of the seat back 12 until the catch flange 23 (not shown in this figure) engages the installation notch 18 on the guide sleeve 14. The headrest main body 34 is then tipped down and forward into the headrest shipping position.

At this point, any electrical connections that may have to be made due to electronics mounted within the headrest main body 34 can be since the headrest stays with the seat for the rest of the assembly process. Examples of such electronics might be a headrest that includes integral speakers, an antenna, or a motor for tilting the headrest to various comfort positions within a range of use positions. A flexible wire conduit can be attached between the headrest main body 34 and the seat back 12 to house any wiring extending therebetween. When the headrest is moved between the shipping and normal operating positions, the slack of the flexible conduit can simply be disposed within a separate guide tube (not shown) of the seat back 12 or headrest main body 34. Therefore, the use of wiring harnesses and their connection would not be required at the vehicle assembly plant. Further, the functioning of the headrest assembly 36 can be checked at the seat assembly location. Now the seat 12, with the headrest 36 is shipped to a vehicle assembly plant. Once there, it can be assembled into a vehicle.

A typical vehicle body 50 is illustrated in FIGS. 3c and 3d. This vehicle body 50 includes a door opening 52, and an instrument panel 54 that is already installed in the vehicle. It also illustrates a permitted clearance requirement 56 (phantom line) within the door opening 52, within which a seat and/or headrest must fit during installation. The clearance requirement 56 is set by the particular vehicle manufacturer and is meant to assure that the seat 10 does not bang against or snag on anything while being installed. One will note that, if the headrest assembly 36 were in its vehicle use position during installation, the seat 10 and headrest 36 could not be installed through the door opening 52 within the clearance requirement area 56. But, with the headrest body 34 tipped forward and down, the seat 10 will fit within the clearance requirement area 56 of the door opening 52.

FIG. 3c illustrates the seat 10 and headrest 36 being installed through the vehicle door opening 52. Once in the vehicle, conventional assembly processes are used to secure the seat to the vehicle.

As shown in FIG. 3d, after installation in vehicle, the headrest main body 34 is tipped up and pushed down until the support post notch 38 engages the catch flange 23 (not shown in this figure) of the guide sleeve 14. Note that, with the headrest assembly 36 in its use position, the installation hinge 30 is disposed in the guide sleeve 14 of the seat back 12. This is so that during normal operation of the headrest, the hinge 30 will not take any loads. The installation is now complete and the headrest 36 cannot be raised again to where the installation hinge 30 is removed from the guide sleeve 14 without manipulating the catch release 21.

The headrest 36 can be configured and operated in any suitable manner. For example, the headrest can be a 4-way headrest in which the headrest can move vertically (up/down) and pivot along a lateral axis since the installation hinge 30 has no effect once the headrest 36 is inserted into its use position. The headrest can be manual or power operated.

If so desired, one can employ a modified installation catch 20, which requires a tool in order to release the installation notch 18 and the support post notch 38 (when pulling the headrest farther out of the seat) so that the hinge will only be exposed for servicing of the headrest, but a typical vehicle occupant cannot remove the headrest that far.

While certain embodiments of the present invention have been described in detail, those familiar with the art to which this invention relates will recognize various alternative designs and embodiments for practicing the invention as defined by the following claims.

What is claimed is:

1. A seat for a vehicle comprising:
   a seat back portion that is adapted to mount generally vertically in the vehicle, with the seat back portion including a head rest support receiver having a removal limiter; and
   a headrest including a main body; an installation post having a first end received within the support receiver, and a second end, disposed opposite to the first end, having a hinge receiving portion; and a support post having a first end securely connected to the main body, a second end, disposed opposite to the first end, having a hinge portion pivotally connected to the hinge receiving portion, and a first engagement device engageable with the removal limiter when the hinge portion is received within the support receiver.

2. The seat of claim 1 wherein the installation post further includes a second engagement device for engaging with the removal limiter and retaining the installation post once installed partially into the support receiver.

3. The seat of claim 2 wherein the support receiver is a guide sleeve, and the installation post and support post are telescopically received within the guide sleeve.

4. The seat of claim 3 wherein the removal limiter is an installation catch having a catch flange and a catch release, and the first engagement device is an installation notch, with the catch flange received within the installation notch.

5. The seat of claim 4 wherein the catch release couples to the catch flange or removing the catch flange from the installation notch.

6. The seat of claim 1 wherein the installation post is made of plastic and the support post is made of metal.

7. The seat of claim 1 further including an installation hinge screw pivotally coupled to the hinge portion and the hinge receiving portion.

8. A headrest for a vehicle seat having a seat back and a support receiver with a removal limiter, the headrest comprising:
   a main body adapted for receiving a head of a vehicle occupant;
   an installation post having a first end adapted to be received within the support receiver, and a second end, disposed opposite to the first end, having a hinge receiving portion; and
   a support post having a first end securely connected to the main body, a second end, disposed opposite to the first end, having a hinge portion pivotally connected to the hinge receiving portion, and a first engagement device adapted to engage with the removal limiter when the hinge portion is received within the support receiver.

9. The headrest of claim 8 wherein the installation post further includes a second engagement device adapted for engaging with the removal limiter and retaining the installation post once installed partially into the support receiver.

10. The headrest of claim 9 wherein the support receiver is a guide sleeve, and the installation post and support post are adapted to be telescopically received within the guide sleeve.

11. A method for installing a seat and headrest into a vehicle, with the seat having a seat back portion that includes a support receiver and a removal limiter, and the headrest having a main body; an installation post having a first end received within the support receiver, and a second end, disposed opposite to the first end, having a hinge receiving portion; and a support post having a first end securely connected to the main body, a second end, disposed opposite to the first end, having a hinge portion pivotally connected to the hinge receiving portion, and a first engagement device engageable with the removal limiter when the hinge portion is received within the support receiver; the method comprising the steps of:
   hingedly connecting a headrest support post to a headrest installation post;
   installing the installation post partially within the support receiver of the seat back prior to installation of the seat into the vehicle;
   installing the seat into the vehicle; and
   after installation of the seat into the vehicle, manipulating the headrest to cause the support post to partially insert within the support receiver such that the removal limiter engages the first engagement device.

12. The method of claim 11 wherein the headrest installation post further includes a second engagement device for engaging with the removal limiter and retaining the installation post once installed partially into the support receiver, with the step of installing the installation post comprising: installing the installation post partially within the support receiver such that the removal limiter engages the second engagement device.

* * * * *